(12) United States Patent
Gärdenfors et al.

(10) Patent No.: US 6,633,550 B1
(45) Date of Patent: Oct. 14, 2003

(54) RADIO TRANSCEIVER ON A CHIP

(75) Inventors: Karl Håkan Torbjörn Johansson Gärdenfors, Malmo (SE); Sven Mattisson, Bjärred (SE); Jacobus Cornelis Haartsen, Staffanstorp (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1001 days.

(21) Appl. No.: 08/803,392

(22) Filed: Feb. 20, 1997

(51) Int. Cl.[7] .............................................. H04B 7/005
(52) U.S. Cl. ....................... 370/280; 340/572.1; 455/87
(58) Field of Search ................................ 370/280, 282, 370/290; 455/76, 83, 318, 87; 340/572, 572.1

(56) References Cited

U.S. PATENT DOCUMENTS

| | | | |
|---|---|---|---|
| 3,324,396 A | * | 6/1967 | Schneider ..................... 455/87 |
| 4,656,463 A | * | 4/1987 | Anders et al. |
| 5,140,286 A | | 8/1992 | Black et al. ..................... 331/99 |
| 5,265,267 A | | 11/1993 | Martin et al. ................. 455/326 |
| 5,335,361 A | | 8/1994 | Ghaem ........................ 455/66 |
| 5,390,363 A | | 2/1995 | Mirtich et al. ................. 455/87 |
| 5,410,745 A | | 4/1995 | Friesen et al. ............... 455/333 |
| 5,428,835 A | | 6/1995 | Okanobu .................... 455/310 |
| 5,428,837 A | | 6/1995 | Bayruns et al. ............. 455/317 |
| 5,528,769 A | | 6/1996 | Berenz et al. ............... 455/333 |
| 5,734,970 A | * | 3/1998 | Saito ........................... 455/87 |
| 5,740,522 A | * | 4/1998 | Dolman et al. ............... 455/76 |
| 5,745,843 A | * | 4/1998 | Wetters ........................ 455/87 |
| 5,758,265 A | * | 5/1998 | Okanobu ..................... 455/76 |

FOREIGN PATENT DOCUMENTS

| | | |
|---|---|---|
| DE | 195 02 111 A 1 | 1/1995 |
| GB | 2 296 610 A | 7/1996 |

OTHER PUBLICATIONS

The Communications Handbook, J.D.Gibson. pp 87–93, 1996.*
*Performance Evaluation of a Single Chip Radio Transceiver* by Kendal McNaught–Davis Hess and Daniel E. Fague 1996 IEEE 46th Vehicular Technology Conference vol. 2, Apr. 28, 1996, pp. 1048–1051, XP000593123.
EPO Search Report Form 1503, File RS 99030 US, Search Completed Jul. 21, 1997.
EPO Search Report Form 1503, File RS 99030 US, Search Completed Jan. 16, 1998.

* cited by examiner

Primary Examiner—Brian Zimmerman
(74) Attorney, Agent, or Firm—Jenkens & Gilchrist, P.C.

(57) ABSTRACT

An entire radio transceiver can be completely integrated into one IC chip. In order to integrate the IF filters on the chip, a heterodyne architecture with a low IF is used. A single, directly modulated VCO is used for both up-conversion during transmission, and down-conversion during reception. Bond-wires are used as resonators in the oscillator tank for the VCO. A TDD scheme is used in the air interface to eliminate cross-talk or leakage. A Gaussian-shaped binary FSK modulation scheme is used to provide a number of other implementation advantages.

17 Claims, 3 Drawing Sheets

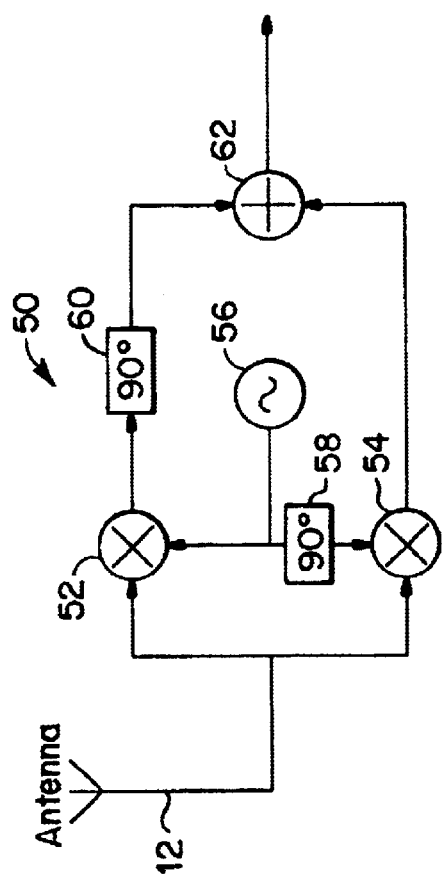
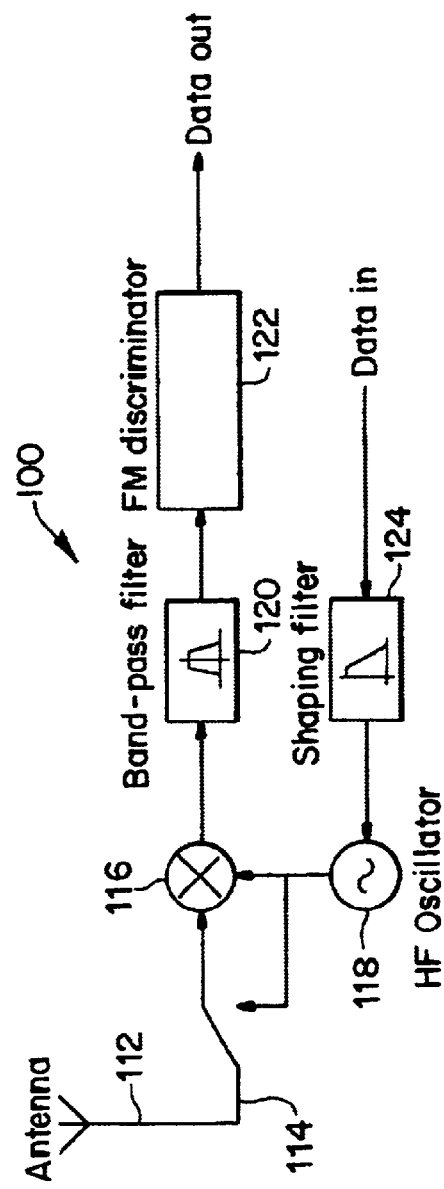

RADIO TRANSCEIVER ON A CHIP

BACKGROUND OF THE INVENTION

1. Technical Field of the Invention

The present invention relates in general to the wireless communications field and, in particular, to a short-range radio transceiver fabricated on an integrated circuit chip.

2. Description of Related Art

The high level of circuit integration possible with modern technology has allowed manufacturers of hand-held communications equipment (e.g., cellular phones) to substantially reduce the size of their products. As a general rule, these smaller products consume less power and ultimately become cheaper to produce.

In the past, there have been a number of attempts to fabricate an entire radio transmitter/receiver (transceiver) on a single integrated circuit (IC) chip. Generally, these attempts have been unsuccessful, and only parts of such radios have been placed on a single chip. For example, U.S. Pat. No. 5,428,835 to Okanobu discloses a receiver circuit formed on a single semiconductor chip. The primary reason for this lack of total integration can be found in the radio system specifications.

Most standard air interface specifications for radio communications systems set forth high requirements with respect to frequency accuracy, adjacent channel interference, modulation performance, etc. However, existing on-chip signal processing techniques have not yet reached a level that can meet the performance criteria set by these air interface specifications.

SUMMARY OF THE INVENTION

It is an object of the present invention to significantly reduce the overall size of a radio transceiver.

It is another object of the present invention to produce a short-range wireless radio link that is less costly than a cable link.

It is yet another object of the present invention to produce a short-range radio transceiver on a single integrated circuit chip.

In accordance with the present invention, the foregoing and other objects are achieved by a radio transceiver architecture that can be completely integrated into one semiconductor IC chip. In order to integrate the transceiver's IF filters into the chip, a heterodyne architecture with a relatively low IF is used. A single directly modulated VCO is used for both up-conversion during transmission, and down-conversion during reception. Bondwires are used as resonators in the oscillator tank for the VCO. A time-division duplex scheme is used in the air interface to eliminate cross-talk or leakage. A Gaussian-shaped binary FSK modulation scheme is used to provide a number of other implementation advantages.

BRIEF DESCRIPTION OF THE DRAWINGS

A more complete understanding of the method and apparatus of the present invention may be had by reference to the following detailed description when taken in conjunction with the accompanying drawings wherein:

FIG. 3 is a block diagram of an image-rejection mixer stage that can be used for down-conversion with the receiver architecture illustrated in FIG. 1;

FIG. 4 is a schematic block diagram of a single chip transceiver architecture, which can be used to implement the apparatus and method of the present invention.

DETAILED DESCRIPTION OF THE DRAWINGS

Figure 1:
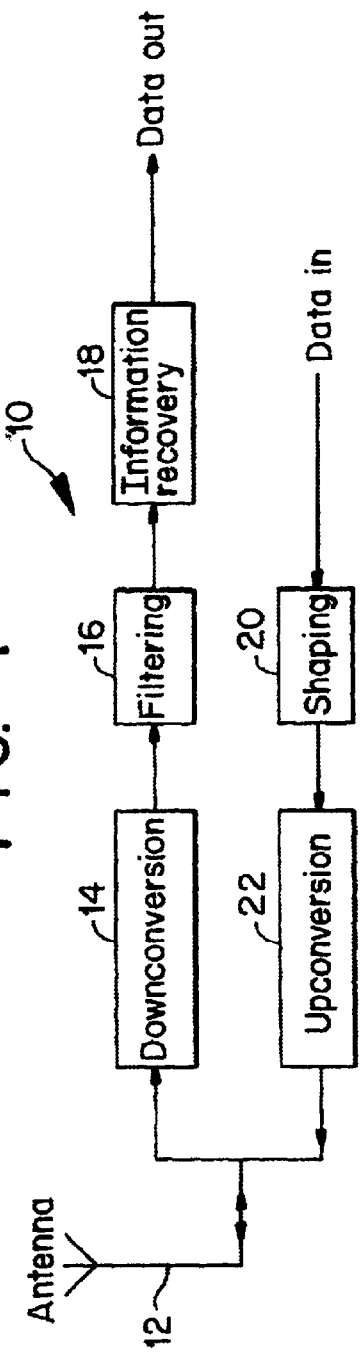
FIG. 1 is a basic functional block diagram of a radio transceiver architecture, which can be used to facilitate an understanding of the present invention.

The preferred embodiment of the present invention and its advantages are best understood by referring to FIGS. 1–5 of the drawings, like numerals being used for like and corresponding parts of the various drawings.

For the preferred embodiment, the air interface specification allows digital transmission of both voice and data. Such an air interface that can be used is described in commonly-assigned U.S. patent application Ser. No. 08/685,069 to Dent, et al., filed Jul. 13, 1996, entitled "Short-Range Radio Communications System And Method Of Use." The frequency band that can be used is the unlicensed Industrial, Scientific, Medical (ISM) band at 2.4 GHz, which has 83.5 MHz bandwidth available for use. However, in the United States, the Federal Communications Commission (FCC) requires frequency spreading for operations where the transmitted power is higher than 0 dBm. There can be numerous "interferers" or "jammers" operating in this band (e.g., microwave ovens are notorious "interferers" in this band). Consequently, a frequency hopping scheme is used to provide increased immunity to such interference. Notably, in contrast to direct sequence frequency spreading, the interference immunity provided by frequency hop spreading is independent of the jammer's transmitted power.

In addition, with respect to the preferred embodiment, average frequency spreading over the entire 83.5 MHz band results without having to process wide bandwidth signals. Although the frequency spectrum that the embodied transceiver can be operated in is wide enough to provide the spreading, the instantaneous bandwidth can be small, which allows the transceiver's front end to be operated at a narrow band. In the preferred system, the instantaneous (channel) bandwidth is 1 MHz, whereas the hopping is carried out in a pseudo-random way over 79 hop channels (spanning 79 MHz). The preferred modulation scheme used is binary Gaussian-shaped frequency shift keying (GFSK). This approach provides a robust wireless communications link and allows the use of relatively simple transmitter and receiver circuitry.

For the preferred embodiment, the information signals are transmitted in packets. Automatic Repeat Request (ARQ) error correction is employed to re-transmit packets received with errors in the data field. The voice field is not re-transmitted, but the (robust) Continuous Variable Slope Delta (CVSD) modulation scheme is used for speech coding. CVSD is a type of adaptive delta modulation scheme whereby performance degrades gracefully in the presence of noise. A time-division duplex (TDD) scheme is used to achieve a full-duplex communications link. A duplex frame lasts 1.25 ms, in which a packet is sent in one direction during the first 625 $\mu$s, and another packet is sent in the opposite direction during the second 625 $\mu$s. Each transmission occurs at a new hop frequency, which is determined by the user-dependent pseudo-random hop sequence.

In order to better understand the invention, it will be useful at this point to describe a radio transceiver in general terms. FIG. 1 is a basic functional block diagram of a radio transceiver architecture (10), which can be used to facilitate an understanding of the present invention. First considering the receiver section of the transceiver, due to requirements imposed based on antenna size and propagation conditions, the signals propagated over the air are normally conveyed by radio-frequency (RF) carriers. An RF signal received at the antenna (12) is frequency down-converted (14) to facilitate signal processing. Notably, the information being carried has a much lower rate than the carrier frequency. Next, the down-converted signal is filtered (16), in order to suppress all interference and noise outside the frequency band of interest, and thus improve the receiver's signal-to-noise ratio. This process is commonly referred to as "channel filtering," since only the channel or frequency band of interest is filtered out.

Once the received signal has been channel filtered, the next step in the process is to recover the information (18) from the channel and convert it into a usable format. For example, the information recovered can be in the form of discrete symbols (e.g., data out) such as those used in digital modulation schemes, or an analog signal for audio or video applications. Notably, the key function of the receiver section is to filter out the band of interest from the rest of the frequency spectrum.

The transmitter section of the transceiver (10) converts or shapes (20) the information to be transmitted into a signal format that can be conveyed by a carrier. That signal is then frequency upconverted (22) to the desired high frequency (RF) band and transmitted from the antenna (12). Notably, for the transmitter section, the key function is to confine the transmitted signal power to the band of interest (i.e., to leak as little signal power as possible to frequencies outside the band of interest).

Figure 2:
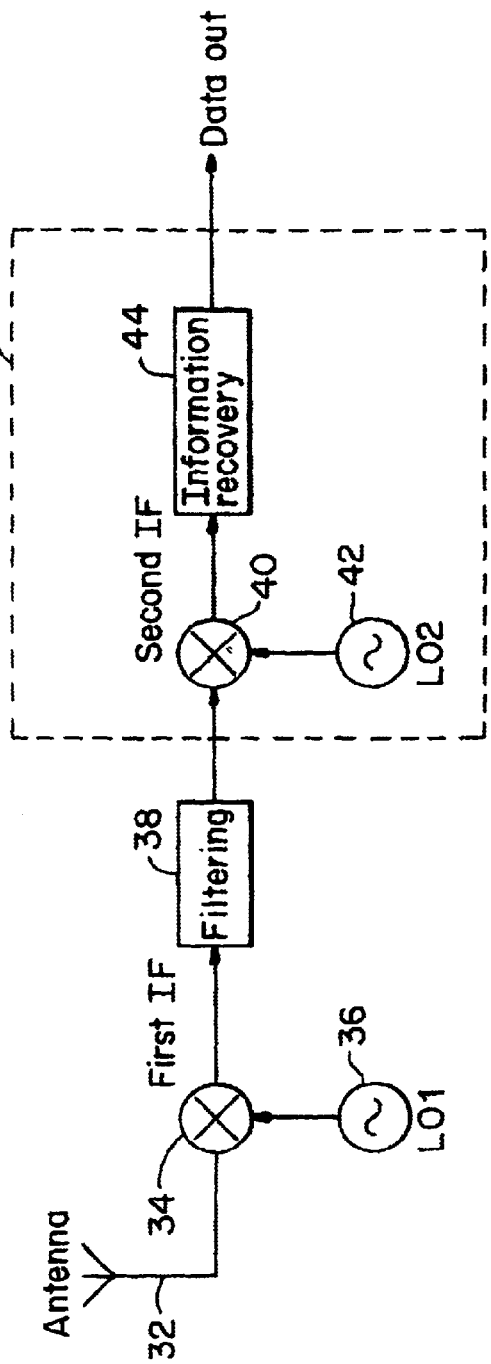
FIG. 2 is a block diagram of a conventional receiver section, which can be used to implement the functions of the receiver section shown in FIG. 1.

FIG. 2 is a block diagram of a conventional receiver section 30, which can be used to implement the functions of the receiver section shown in FIG. 1. Most conventional radio receivers employ a superheterodyne receiver architecture, such as the architecture of receiver section 30 shown in FIG. 2. The received RF carrier from antenna 32 is down-converted to a first intermediate frequency (IF) by mixing (34) the RF signal with a first local oscillator signal (36). A suitable bandpass filter 38 (e.g., with sharp cut-off characteristics) is used for channel filtering. The channel filtered signal is then down-converted to a baseband signal, by mixing (40) the filtered signal with a second local oscillator signal (42). At this point, additional filtering of the baseband signal may be used. The information to be used (e.g., data) is thereby recovered (44).

One problem with integrating such a receiver on a chip deals with integrating the IF bandpass filters (e.g., 38). For example, the performance of a filter is determined by its quality (Q) factor. Q is a measure of a filter's selectivity (how well it filters) and can be represented by the expression: $Q=f_0/BW$, where ($f_0$) is the filter's center frequency, and BW is the filter's bandwidth. Therefore, a narrow filter centered at a high frequency would have a high Q.

Generally, bandpass filters can be fabricated by a number of techniques and integrated on semiconductor chips. However, the Q values achievable for such filters are significantly limited using conventional electronic components in silicon technology. The primary limiting factors are the losses that occur between electronic components on the chip.

With respect to reducing interference and noise, only the bandwidth (BW) of the filter determines its performance in terms of signal-to-noise ratio. For a fixed bandwidth, low-Q filters can be integrated on a chip by lowering the center frequency, $f_0$. For the extreme case, $f_0$ becomes zero and the bandpass filter becomes a lowpass filter, which is much easier to integrate on chip than a bandpass filter. In this case, the signal being processed can be converted to baseband with only one down-conversion step. Of course, this approach is attractive from an integration standpoint and is indeed a way to obtain full integration. However, a second problem occurs with this approach, which is referred to as a "homodyne" or "zero-IF" architecture.

A so-called "DC offset" problem occurs with a zero-IF architecture, because the signal being processed is mapped directly to DC. Consequently, interference at DC is indistinguishable from the desired signal and cannot be filtered out. This problem also places more stringent requirements on the even order intermodulation characteristics of the receiver. Part of the DC offset can be removed with additional signal processing, but this approach increases circuit complexity and the power consumption of the IC.

An intermediate approach, which is suitable for integrating IF filters on a semiconductor chip, is to use a "low-IF" architecture. With this approach, the IF or filter's center frequency, $f_0$, is a relatively low frequency, but not zero. This type of architecture allows fabrication of a low Q filter which is suitable for integration on a chip while avoiding DC problems.

Nevertheless, a third problem arises, which has to do with the image carrier. The process of mixing the received (RF) signal with a local oscillator carrier, $f_{lo}$, produces a low IF signal, $f_0$, which not only maps the frequency band of interest at $f_{lo}+f_0$, but also maps the image band at $f_{lo}-f_0$ to the IF signal (or vice versa). This process causes a significant problem, because after the two RF bands are mapped onto the same IF band, they are no longer distinguishable from each other. Therefore, an image-rejection device should be used.

FIG. 3 is a block diagram of an image-rejection mixer stage (50) that can be used for down-conversion with the receiver architecture illustrated in FIG. 1. Using such a stage, the received RF signal from antenna 12 is coupled to a first and second mixer (52, 54). A local oscillator signal (56) is coupled directly to the first mixer (52), and also phase-shifted 90 degrees (58) and coupled to the second mixer (54). The down-converted signal from the first mixer (52) is phase-shifted 90 degrees (60) and algebraically added (62) to the phase-shifted, down-converted signal from the second mixer (54), which ultimately functions to suppress the image band.

The amount of image band suppression that can be realized with such image-rejection circuitry (e.g., FIG. 3) depends on how well the circuit components can be matched, and depends on the frequency bandwidth over which suppression is desired. With on-chip components, a relatively high matching accuracy should be attainable. Nevertheless, in practice, the image rejection actually attainable for on-chip circuitry is somewhat limited (e.g., about 30–40 dB for a 1 MHz bandwidth). However, in accordance with the present invention (as described above with respect to the air interface), a frequency hopping system is employed in which each packet is transmitted in one of 79 available hop frequencies. Occasionally, interference such as a collision between packets can occur if two different users simultaneously occupy the same frequency hop. Consequently, with reduced image rejection performance, it follows that different users's packets occupying each other's image bands can also interfere with each other. In any event, for the preferred embodiment, such occasional packet collisions, whether resulting from co-channel, image-channel, or adjacent channel interference, are accounted and compensated for in the air interface operations by employing an appropriate ARQ protocol for data transfers, and a robust speech coding format (e.g., CVSD) for voice transfers. In other words, the present invention compensates for degraded receiver performance due to image interference, by the use of frequency hop spreading, error correction, and speech coding techniques specified for the air interface, which allows full integration of the receiver and (as described below) transmitter sections of the transceiver on a single IC chip.

Previously, when an attempt was made to place a transmitter and receiver on a single chip, one problem that occurred was that signals transmitted at relatively high power levels leaked into the receiver's input stage. In fact, such leakage or "cross-talk" has been a major design problem in previous attempts to fabricate an entire transceiver on a chip. However, for the preferred embodiment of the invention, a TDD scheme is used for duplex operation over the air interface, which eliminates cross-talk and thereby facilitates full integration of the transceiver on a chip. In other words, the transmitter and receiver sections of the embodied transceiver are not active simultaneously, and the problem of cross-talk or leakage from the transmitter to receiver in a fully integrated transceiver is resolved.

Additionally, cross-talk or leakage can be reduced further by employing different transmit and receive frequencies using a frequency-division duplex (FDD) scheme. Normally, the use of an FDD scheme would require a duplexer at the transceiver's antenna stage in order to separate the transmitted and received signals. However, by also employing a TDD scheme in accordance with the invention, such a duplexer is not needed. Moreover, to further reduce the number of components on the chip, a single variable controlled oscillator (VCO) is used in the preferred embodiment, alternately for up-conversion in the transmit section and down-conversion in the receive section.

FIG. 4 is a schematic block diagram of a single chip transceiver architecture, which can be used to implement the apparatus and method of the present invention. For the preferred embodiment, binary FSK shaped with a Gaussian filter is the modulation scheme used. Specifically, the use of FSK modulation for a single chip transceiver has a number of implementation advantages. For example, the detection function is carried out directly at the IF with a frequency modulation (FM) discriminator stage (122). This approach eliminates the need for a second down-conversion to baseband stage for information recovery. Next, the transmit section is simplified so that the information symbols to be transmitted can be coupled directly to a VCO (e.g., HF oscillator 118), which converts these symbols to an FM signal. With this approach, a single VCO is sufficient for the transmit section, and the need for a separate up-conversion mixer is eliminated. Yet another advantage of using FSK is that the non-coherent detection of FSK signals is relatively insensitive to frequency errors. In this case, a frequency error shows up as a DC offset signal at the output of the FM detector. However, an automatic frequency control (AFC) stage can be used to quickly compensate for the offset. This approach eliminates the need for highly stable local oscillator stages or accurate frequency tracking schemes.

Still another advantage of FSK modulation is that the received signal can be hard-limited after channel filtering. The information being received is contained only in the phase and not in the amplitude of the signal. Consequently, this approach eliminates the need for awkward automatic gain control (AGC) circuitry and amplitude tracking schemes. The AGC operation would also be severely hindered by the frequency hopping defined in the air interface due to the uncorrelated signal fading on the different hop frequencies.

Returning to FIG. 4, by making appropriate adjustments in the air interface (as described above) to compensate for implementation problems encountered with others' previous attempts to integrate an entire transceiver on a single IC chip, the relatively simple architecture shown in FIG. 4 can be used (in accordance with the present invention). In comparison with the architecture disclosed in FIG. 1, the basic blocks of FIG. 1 are still recognizable. Notably, each basic block shown in FIG. 1 can be replaced by only one circuit in the architecture shown in FIG. 4. For example, in FIG. 4, the down-conversion step is performed in the image-rejection mixer (116), which converts the signal from RF to a low IF. A bandpass filter (120), which is selective at this low IF, performs the channel selection. This channel filtered signal is then recovered in an FM discriminator (122). Notably, no second down-conversion step to a lower IF or baseband frequency is required, since the FM discriminator (122) can detect the received signal directly at the low IF.

In the transmitter section of FIG. 4, the signal to be transmitted is shaped with a Gaussian shaping filter (124) in order to suppress the out-of-band signal power. The shaped signal is coupled directly to a VCO (118), which generates the FM signal directly at the desired RF. Notably, only a single VCO is needed for the entire transceiver. This same VCO (118) performs the down-conversion function during the receive cycle, and the up-conversion function during the transmit cycle. The low-IF used is selected at an appropriate frequency, in order to allow on-chip integration of a bandpass filter (120) with sufficient selectivity. For the preferred embodiment, a 3 MHz IF ($f_o$) is used, which allows implementation of a CMOS gyrator filter (on chip) with a bandwidth of 1 MHz and, thus, a Q of 3. The low-pass shaping filter (124) and a low-pass detection filter (not explicitly shown) subsequent to the FM discriminator can be implemented in a similar way. The FM detector (122) is preferably fabricated as a quadrature detector. For the VCO stage (118), bond-wire inductors are used as resonators in the oscillator tank, without external (off-chip) components. Preferably, all filters are tuned with a common reference circuit to compensate for fabrication tolerances.

Figure 5:
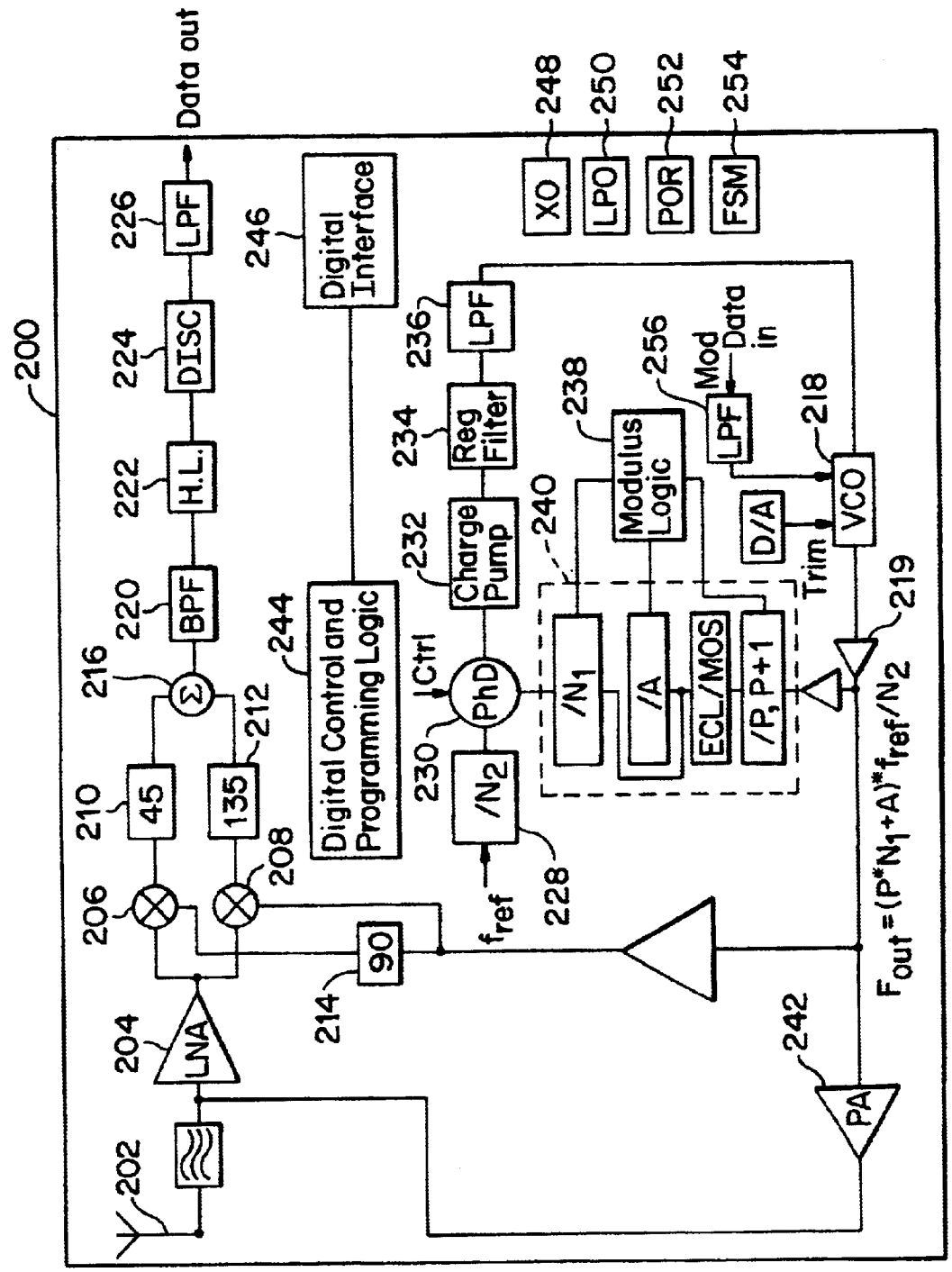
FIG. 5 is a detailed circuit block diagram of a radio transceiver on a single IC chip, in accordance with a second embodiment of the present invention.

FIG. 5 is a detailed circuit block diagram of a short-range radio transceiver mounted on a single IC chip, in accordance with a second embodiment of the present invention. However, although the radio transceiver shown is described with respect to a single IC chip implementation, this description is for illustrative purposes only and the present invention is not intended to be so limited. For example, some of the components shown in FIG. 5 may be located external to the IC chip. Returning to FIG. 5, the transceiver on a chip (200) includes a transmit/receive antenna 202 coupled to a low noise amplifier (LNA) 204 in the receiver front end. The output of the LNA is coupled to an image-rejection mixer, which is composed of a first mixer 206 for the I channel, a second mixer 208 for the Q channel, a 45 degree phase shifter 210, a 135 degree phase shifter 212, a 90 degree phase shifter 214, and a combiner 216. A local oscillator signal is coupled to the 90 degree phase shifter 214 from a VCO 218. Consequently, image rejection is accomplished by recombining the phase shifted IF I and Q signals to produce an output IF signal from the combiner 216.

For this embodiment, the IF signal selected is about 3.0 MHz. The IF signal output from the combiner 216 is coupled to the IF receiver circuitry, which includes a bandpass filter 220 to suppress signals on adjacent channels. The bandpass filter is preferably a stagger-tuned IF filter using transconductance-C type filtering. The IF receiver circuitry also includes a hard limiter (H.L.) 222, an FM discriminator 224, and a lowpass filter 226. The IF receiver circuitry can also include an RSSI indicator with an A/D converter (not explicitly shown). The IF signal is detected (224), and the information recovered is output from the lowpass filter 226.

Transceiver 200 on a chip also includes a phase locked loop, which is composed of a phase detector 230, loop filter 236, and a prescaler with modulus logic 240. The phase locked loop is a component of a synthesizer including the phase detector 230, charge pump 232, regulator filter 234, loop filter 236, prescaler 240, modulus logic circuitry 238, VCO 218, and a buffer 219. As such, the input information signal (e.g., data in), shaped by the shaping filter 256, is used to directly modulate the VCO. A sample-and-hold (S/H) circuit (not explicitly shown) stabilizes the input voltage to the VCO, while the VCO is being directly modulated. The VCO 218 is also a component of the transmitter section. For transmissions, the output of the VCO 218 is coupled to a power amplifier 242 and to the antenna 202.

Fully differential signal paths are used to suppress common-mode noise and interference signals. In addition, all receive filters, transmit filters, and the FM discriminator apply matched electronic circuits. Autotuning of all the filters and the discriminator is provided by a reference filter which is locked to the crystal oscillator 248.

The transceiver 200 also includes digital circuitry 244 to provide power down control, programming of certain analog blocks on the chip due to process variations, and synthesizer control logic. The digital circuitry 244 is connected to a serial digital interface connection 246. A number of typical functional circuit blocks are also included on the chip, such as, for example, a crystal oscillator (XO) 248, frequency adjustable low power oscillator (LPO), power-on-reset (POR) 252, and finite state machine (FSM) 254. Consequently, the one chip transceiver shown in FIG. 5 includes power down logic for all analog circuit blocks, logic to tune the analog circuit blocks, a serial-to-parallel converter, and decoding logic.

In summary, as illustrated by the embodiments shown in FIGS. 4 and 5, an entire radio transceiver is completely integrated into one IC chip. In order to integrate the IF filters on the chip, a heterodyne architecture with a relatively low IF is used. A single directly modulated VCO is used for both up-conversion and down-conversion, and bond-wires are used as resonators in the oscillator tank for the VCO. A TDD scheme is used in the air interface to eliminate cross-talk or leakage. A Gaussian-shaped binary FSK modulation scheme is used to provide a number of other implementation advantages (as described above).

Although a preferred embodiment of the method and apparatus of the present invention has been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A radio on a single IC chip, comprising:
   an antenna section for transmitting and receiving a plurality of high frequency signals, said radio including means for transmitting and receiving said plurality of high frequency signals in a time division duplex mode;
   a single heterodyne down-conversion section coupled to said antenna section, for down-converting directly from a first high frequency signal of said plurality of high frequency signals to a low intermediate frequency signal;
   a bandpass filter coupled to said down-conversion section;
   a discriminator coupled to said bandpass filter for detecting a received data signal from said low intermediate frequency signal;
   an up-conversion section coupled to said antenna section, for up-converting an information signal to a second high frequency signal of said plurality of high frequency signals, said up-conversion section comprising a portion of said down-conversion section;
   a shaping filter coupled to an input of said up-conversion section; and
   said down-conversion section, bandpass filter, discriminator, up-conversion section and shaping filter integrated into said single IC chip, wherein bandpass filtering operations are performed by components integrated into said single IC chip.

2. The radio of claim 1, wherein said low intermediate frequency signal is centered at about 3 MHz.

3. The radio of claim 1, wherein said down-conversion section includes a variable controlled oscillator.

4. The radio of claim 1, wherein said up-conversion section includes a variable controlled oscillator.

5. The radio of claim 1, wherein said up-conversion section includes a directly modulated variable controlled oscillator.

6. The radio of claim 1, wherein said down-conversion section includes an image rejection mixer stage.

7. The radio of claim 1, wherein said shaping filter comprises a Gaussian shaping filter.

8. The radio of claim 1, further comprising a binary frequency shift keying modulation means.

9. The radio of claim 1, further comprising automatic re-transmission request error correction means for data transfer.

10. The radio of claim 1, further comprising continuous variable slope delta modulation means for voice transfer.

11. The radio of claim 1, wherein said discriminator comprises a frequency modulation discriminator.

12. The radio of claim 1, further comprising frequency hopping means for providing interference immunity.

13. The radio of claim 1, further comprising autotuning means for autotuning a plurality of filters and an FM discriminator.

14. A radio on a single IC chip, comprising:
   an antenna section for transmitting and receiving a plurality of high frequency signals, said radio including means for transmitting and receiving said plurality of high frequency signals in a time division duplex mode;
   a down-conversion section coupled to said antenna section, for down-converting a first high frequency signal of said plurality of high frequency signals to a low intermediate frequency signal;
   a bandpass filter coupled to said down-conversion section;
   a discriminator coupled to said bandpass filter;
   an up-conversion section coupled to said antenna section, for up-converting an information signal to a second high frequency signal of said plurality of high frequency signals, wherein said up-conversion section and said down-conversion section comprise a single variable controlled oscillator; and said variable controlled oscillator integrated into said single IC chip, wherein resonators are implemented for said variable controlled oscillator without components external to said single IC chip; and a shaping filter coupled to an input of said up-conversion section.

15. The radio of claim 14, wherein bond-wire inductance is used to implement said resonators.

16. A radio on a single IC chip, comprising:

an antenna section for transmitting and receiving a plurality of high frequency signals, said high frequency signals transmitted and received in accordance with a frequency hopping scheme for providing interference immunity;

a down-conversion section coupled to said antenna section, for down-converting a first high frequency signal of said plurality of high frequency signals to a low intermediate frequency signal;

a bandpass filter coupled to said down-conversion section;

a discriminator coupled to said bandpass filter;

an up-conversion section coupled to said antenna section, for up-converting an information signal to a second high frequency signal of said plurality of high frequency signals, said up-conversion section comprising a portion of said down-conversion section;

a shaping filter coupled to an input of said up-conversion section;

wherein said frequency hopping scheme is carried out on a plurality of frequencies;

means for transmitting and receiving said plurality of high frequency signals in a time division duplex mode, wherein each of a plurality of duplex frames occurs at a different hop frequency; and wherein said high frequency signals are modulated using binary Gaussian-shaped frequency shift keying.

17. The radio of claim 16, wherein said frequency hopping scheme comprises a pseudo-random scheme.

* * * * *